United States Patent [19]
Burris, Jr.

[11] 3,804,143
[45] Apr. 16, 1974

[54] TIRE ANTI-SKID DEVICE
[76] Inventor: Palmer E. Burris, Jr., 916 145th Pl., Bellevue, Wash. 98007
[22] Filed: Mar. 17, 1972
[21] Appl. No.: 235,601

[52] U.S. Cl. .............................................. 152/225
[51] Int. Cl. .......................................... B60c 27/12
[58] Field of Search .......... 152/167, 185, 189, 208, 152/217, 219, 225, 221, 226

[56] References Cited
UNITED STATES PATENTS

| | | | |
|---|---|---|---|
| 2,936,016 | 5/1960 | Stack | 152/217 |
| 2,717,623 | 9/1955 | Maire et al. | 152/219 |
| 3,476,167 | 11/1969 | Kitsopoulos | 152/225 |
| 3,063,489 | 11/1962 | Blumkin | 152/225 |
| 1,599,001 | 9/1926 | Anderson et al. | 152/208 |
| 2,963,064 | 12/1960 | Rucker | 152/225 |

Primary Examiner—Gerald M. Forlenza
Assistant Examiner—Richard A. Bertsch

[57] ABSTRACT

A motor vehicle tire traction improving device adapted to be quickly attached to the tire. The device includes a plurality of relatively stiff loop members having one end secured to a stiff ring. Each of the loops, designed to be tire contacting is adapted to be secured over the outer periphery of the tire thus presenting a gripping means which overlies the tread for improving the traction of the vehicle. The plurality of loops are secured to the tire by a fulcrum hoop located upon the outside of the tire when in operational position and adapted to place a compressive force upon the loops holding them in position upon the tire. The fact that the traction improving device may be secured to the tire without need for securement upon the inside of the tire makes the device quick and easy to use.

3 Claims, 4 Drawing Figures

TIRE ANTI-SKID DEVICE

BACKGROUND OF THE INVENTION

The need for traction improving devices in snow or heavy mud is well known. In fact, there are some states that require that traction improving devices be used in slippery conditions or the driver is subjected to a very stiff fine.

In an attempt to make the job of driving in adverse conditions more pleasant for the vehicle driver snow tires, studded tires and the like have been developed, however, these have not proven to be entirely satisfactory in extremely adverse conditions. As anyone knows who has secured or removed the standard traction improving chains, the job is frustrating, time consuming and frequently very dirty. Further, the standard traction improving chains are subjected to great stresses if not properly secured and if the chains break they present a vehicle damaging device. The broken piece of chain tends to either wrap around the axel of the vehicle or alternatively continually knock against the inside of the fender causing damage thereto.

In an attempt to obviate the above noted problems it is an object of the present invention to provide a tire traction improving or anti skid device wherein the entire device is quickly and easily placed upon the tire and the apparatus used for securing the device is entirely upon the outside of the tire and thus easily accessible.

It is another object of the present invention to provide a tire traction improving device which generates all of the desirable traits of the standard traction improving chain without the undesirable problem of attaching the device to the tire.

It is yet another object of the present invention to provide a tire traction improving device comprising a plurality of relatively stiff tire engaging means which overlie the tread portion of the tire, are frictionally held in position and locked in place against movement from the tire to prevent removal until it is so desired and the locking apparatus is removed.

Still another object of the present invention is to provide a locking means for a vehicle tire traction improving device wherein the traction improving device comprises a plurality of tread engaging members which are looped about a retaining ring and then wedged against the tire tread by a lever action of a clamping ring which is placed between the tire and the retaining ring.

It is yet another object of the present invention to provide a traction improvement apparatus retaining means wherein the restraining or retaining apparatus includes as an integral portion thereof means to space the tire engaging elements.

DETAILED DESCRIPTION OF THE DRAWINGS

Figure 1:
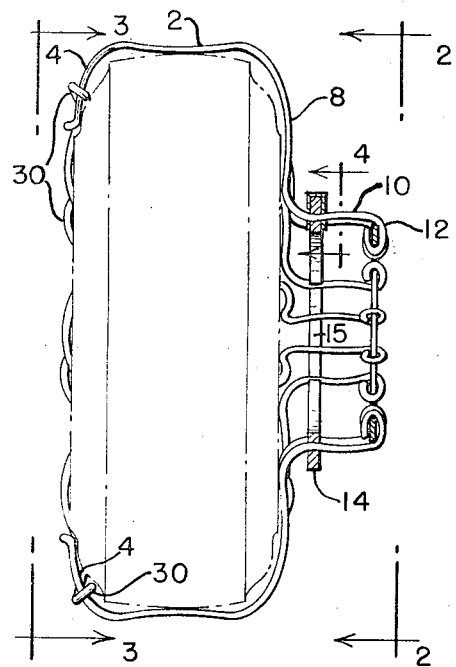
FIG. 1 is an end elevational view of an automobile tire with the traction improving device in position.
Figure 2:
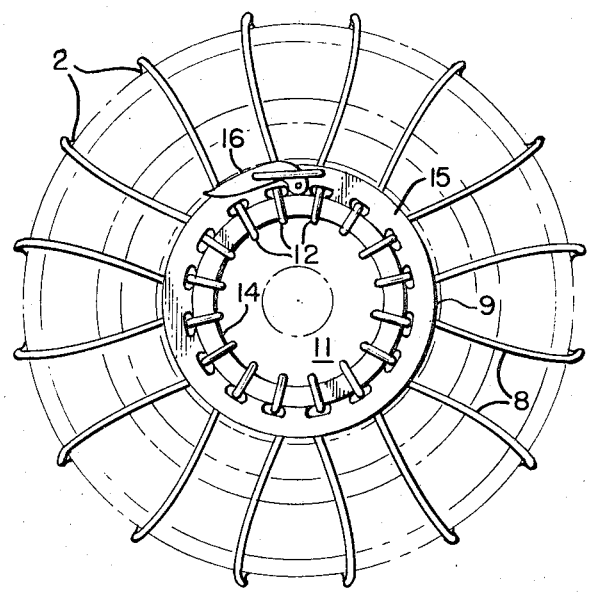
FIG. 2 is a side elevational view taken along lines 2—2 of FIG. 1.

As can be seen in the Figures, the individual traction improvement devices each include a pair of tread contacting and overlying sections 2 adapted to extend the entire width of the tread portion of the tire generally transverse to the direction of travel of said tire. Adapted to be placed on the inside or inboard side of the tire is a section 4 integral with section 2 and which extends down along the interior side wall. The interior ends terminate in the joining or bridging member 6 which is smoothly curved to generally conform with the hub of the tire as well as presenting no tire damaging portions. The other or open end of the loop includes a second side wall engaging element 8 which extends to substantially the bead portion 9 of the tire or outer circumference of the wheel 11 wherein it curves outwardly from the tire as seen at 10 in FIG. 1. The outermost element of each end of the loop is formed into a relatively small radially inwardly formed loop 12.

Thus it may be seen that each tire traction improving element is made of a single piece of durable material which is given a generally U-shaped configuration, 6 being the bottom of the U. The element is then made to conform to the profile of the tire with portion 6 contacting the inner sidewall and the legs of the U shaped to complement the profile. The extremeties are bent outwardly to cooperate with a retaining and securing means to be described in detail hereinafter.

The loops 12 on each of the tread engaging members are circumferentially spaced around a retaining or fulcrum ring 14 which retains the traction improving members in a generally radial configuration about the fulcrum ring but allows pivotal movement therearound for ease of attachment to the tire itself.

The anti skid device is placed into position by firstly placing the fulcrum hoop 14 in coaxial relationship with the wheel. The individual elements are then placed over the tread of the tire in approximately the correct position and wedged onto the tire. Then the traction improving device hereinabove described is secured in position by a retaining loop or band 15 which is applied axially inwardly of the fulcrum ring 12 and between the fulcrum ring 14 and the actual tire itself forcing the elements into their final position.

Figure 4:
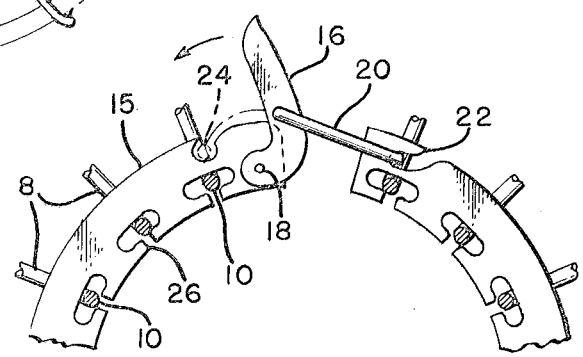
FIG. 4 is an enlarged view of the traction improvement retaining device taken along lines 4—4 of FIG. 1 with the latch only partially secured.

As can be seen in FIG. 4 the retaining loop includes an overcenter latch mechanism having a handle 16 pivotally secured at 18 to the loop or band 15. The use of the overcenter latching mechanism places a far greater locking force upon the retaining ring than would ordinarily be possible. Further, the overcenter feature provides a security factor in that the ring must be compressed slightly before it will latch. The centrifugal forces generated during the rotation of the tire will tend to expand the retaining ring making the unlatching an extremely unprobable occurrance while the auto is in motion. Spacedly secured to the handle 16 from the fulcrum or pivot point 18 is a wire latch 20 adapted to be placed in a notch 22 in the end of the split retaining band 20 which opposes the end including pivot 18 and pivoted to a position in notch 24 when handle 16 is moved to its overcenter position. It is to be noted that when the latch 20 is secured between notches 22 and 24 it would be virtually impossible to remove the retaining latch without movement of the handle 16 an operation which normally would not occur as a natural reaction to rotation of the tire.

Further to be noted in FIG. 4 is the fact that the retaining ring 15 includes a plurality of notches along its interior circumference. These notches denoted as 26 include a radial portion terminating in a circumferential portion such that the axial portions 10 of the tire engaging traction improving members can move slightly within the retaining ring 15 without danger of being accidentially removed from the tire.

Figure 3:
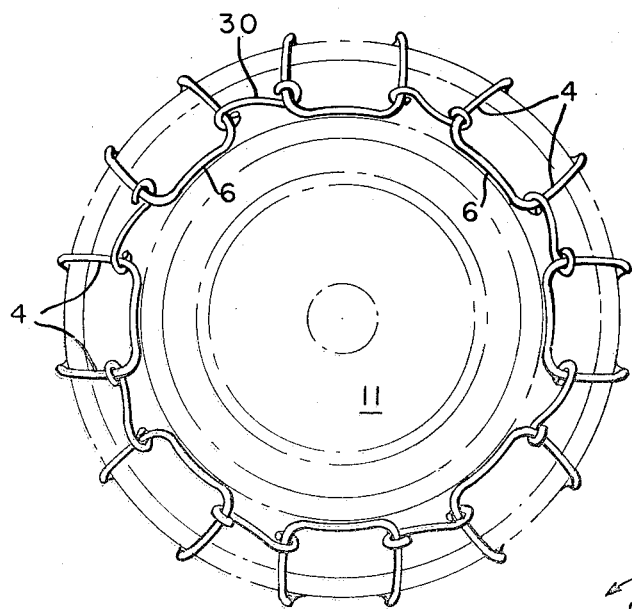
FIG. 3 is a side elevational view from inboard of the wheel taken along line 3—3 of FIG. 1.

As can be seen in FIG. 3, for extremely high speeds or stressful operation it may be desirable to put a tie link or coupler 30 between adjacent traction links to add security in preventing the traction links from accidentally moving away from the tire itself.

In summary, the use of the hereinabove described anti skid or traction improving device allows a driver to place the device in position upon the tire and secure it thereto in a rapid and easy fashion. The device does not require that a securement be made upon the interior of the tire and is held in operative position by the forces generated by the rotating wheel.

The embodiments of the invention in which an exclusive property or privilege is claimed are defined as follows:

1. A readily attachable and removable device for use upon a tire of an automotive vehicle to improve the traction thereof, comprising:
   a plurality of traction elements designed to pass over the tread surface of the tire, extending radially inwardly on both sides of the tire and axially outwardly on the outboard side of the tire, and
   securement means completely outboard of the tire generating a force upon each of the traction elements limited to a diraction substantially radially inward of the tire, said securement means comprising a rigid loop, each of the traction elements secured to the rigid loop at a first end, and an adjustable loop intermediate to and axially inwardly of the first loop and the portion of the traction element adapted to contact the tire, said adjustable loop utilized for generating radial forces at the second end of the traction element by utilizing the first rigid loop as a fulcrum whereby the traction elements are secured by a radial restraining force and forces tending to actually move the traction element are eliminated.

2. A traction improving device as in claim 1 wherein the distance between the radially inwardly directed portions is slightly less than the thickness of the tire whereby the traction elements are wedged onto the tire.

3. A traction improving device as in claim 1 wherein the adjustable loop further includes means for assuring that the traction elements are evenly spaced.

* * * * *